US007018608B2

(12) United States Patent
Tanaka et al.

(10) Patent No.: US 7,018,608 B2
(45) **Date of Patent: *Mar. 28, 2006**

(54) ULTRAFINE PARTICULATE TITANIUM OXIDE AND PRODUCTION PROCESS THEREOF

(75) Inventors: Jun Tanaka, Toyama (JP); Susumu Kayama, Toyama (JP); Shin-ichiro Tomikawa, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/975,425

(22) Filed: Oct. 29, 2004

(65) Prior Publication Data

US 2005/0113506 A1 May 26, 2005

Related U.S. Application Data

(62) Division of application No. 10/307,406, filed on Dec. 2, 2002, now Pat. No. 6,830,742, which is a division of application No. 09/650,740, filed on Aug. 30, 2000, now Pat. No. 6,544,493.

(60) Provisional application No. 60/153,957, filed on Sep. 15, 1999.

(30) Foreign Application Priority Data

Aug. 30, 1999 (JP) ................................ 11-243539

(51) Int. Cl.
*C01G 23/047* (2006.01)

(52) U.S. Cl. ......................................... 423/610; D28/8

(58) Field of Classification Search ................ 423/612, 423/613, 614, 325, 335, 610; 106/437; D28/8
See application file for complete search history.

(56) References Cited

U.S. PATENT DOCUMENTS

| | | | | |
|---|---|---|---|---|
| 3,615,202 | A | 10/1971 | Stern et al. | |
| 5,508,015 | A | 4/1996 | Gonzalez et al. | |
| 5,698,177 | A | 12/1997 | Pratsinis et al. | |
| 5,759,511 | A | 6/1998 | Diemer, Jr. et al. | |
| 6,153,679 | A | 11/2000 | Kawaji et al. | |
| 6,207,131 | B1 | 3/2001 | Magyar et al. | |
| 6,254,940 | B1 | 7/2001 | Pratsinis et al. | |
| 6,544,493 | B1 * | 4/2003 | Tanaka et al. | 423/613 |

FOREIGN PATENT DOCUMENTS

| | | | |
|---|---|---|---|
| JP | 1-145307 | A | 6/1989 |
| JP | 6-340423 | A | 12/1994 |
| JP | 9-511986 | A | 12/1997 |
| JP | 10-130022 | A | 5/1998 |
| JP | 10-251021 | A | 9/1998 |
| KR | 1999-0044307 | | 6/1999 |
| WO | WO 98/00365 | | 1/1998 |

OTHER PUBLICATIONS

Ceramic Kogaku Handbook (Ceramic Engineering Handbook), compiled by Nippon Ceramics Kyokai, 1st ed. pp. 596-598 (1989).

* cited by examiner

*Primary Examiner*—Edward M. Johnson
(74) *Attorney, Agent, or Firm*—Sughrue Mion, PLLC

(57) ABSTRACT

A pigment comprises a titanium oxide having a BET specific surface area of from about 3 $m^2/g$ to about 200 $m^2/g$, and a D90 diameter corresponding to 90% of a particle size cumulative distribution on a weight basis of about 2.2 μm or less. Also disclosed is a photocatalyst composition, a cosmetic, a cloth, an ultraviolet ray-shielding material and a silicone rubber, each containing a titanium oxide.

6 Claims, 2 Drawing Sheets

ULTRAFINE PARTICULATE TITANIUM OXIDE AND PRODUCTION PROCESS THEREOF

CROSS REFERENCE TO THE RELATED APPLICATIONS

This is a Divisional Application of prior application Ser. No. 10/307,406 filed Dec. 2, 2002 now U.S. Pat. No. 6,830,742, which is a divisional of application Ser. No. 09/650,740 (now U.S. Pat. No. 6,544,493) filed on Aug. 30, 2000, which claims the benefit of the filing date of U.S. provisional application Ser. No. 60/153,957 filed on Sep. 15, 1999 under the provision of 35 U.S.C. 111(b), pursuant to 35 U.S.C. Article 119(e)(1), the disclosures of which are incorporated herein by reference.

BACKGROUND OF THE INVENTION

1. Field of the Invention

The present invention relates to particulates, particularly ultrafine particulates of titanium oxide obtained by a vapor phase process and a production process thereof. Moreover, the present invention relates to particulates, particularly ultrafine particulates of titanium oxide obtained from starting material of titanium tetrachloride, which particulates contain less aggregated particles and have excellent dispersibility. The present invention also relates to a production process of producing such particulates.

2. Description of the Related Art

Particulates, particularly ultrafine particulates of titanium oxide have very wide application areas in the industrial field and their diversified uses include an ultraviolet-shielding material, an additive to silicone rubber, a photocatalyst and the like. The "titanium oxide" is referred to as "titanium dioxide" in Japanese Industrial Standard (JIS) but the term "titanium oxide" is used as a common name. Accordingly, this simple term "titanium oxide" is hereinafter used in the present invention.

The importance of titanium oxide is increasing in the use for shielding an ultraviolet ray, for example, in the field of cosmetics, clothing and the like. As a shielding material, ultrafine particulates of titanium oxide are being used in many cases because of its high safety. For the shielding, two functions of absorbing and scattering the ultraviolet rays are necessary. The ultrafine particulates of titanium oxide have both of these two functions.

The titanium oxide has a property of absorbing ultraviolet rays at a wavelength of about 400 nm or less to excite electrons. When the electrons and the holes generated reach the surface of particulates, they combine with oxygen or water to generate various radical species. The radical species have an action of decomposing organic materials and therefore, in the case of using titanium oxide in cosmetics and the like, the ultrafine particulates of titanium oxide are generally surface-treated in advance. The fine particulates of titanium oxide are also used for making use of the photocatalytic reaction resulting from photoexcitation of titanium oxide. Furthermore, where titanium oxide is used for scattering ultraviolet rays, ultrafine particulates of titanium oxide having a primary particle size of about 80 nm are used. Although ultrafine particulates in general are not strictly defined with respect to the primary particle size, fine particles having a primary particle size of about 0.1 μm or less are usually called ultrafine particles (particulates).

The titanium oxide is generally produced using a liquid phase process where titanium tetrachloride or titanyl sulfate as a starting material is hydrolyzed in a hydrophilic solvent or a vapor phase process where a volatile starting material such as titanium tetrachloride is vaporized and then reacted in the gas state with an oxidizing gas such as oxygen or steam at a high temperature. For example, JP-A-1-145307 discloses a method of producing ultrafine spherical particulates of metal oxide by setting the flow rate of either one of a volatile metal oxide and steam at 5 m/sec or more.

In general, the titanium oxide powder produced by the liquid phase process disadvantageously undergoes heavy aggregation. Accordingly, on use of titanium oxide in cosmetics and the like, the titanium oxide must be strongly cracked or pulverized and as a result, there arise problems such as mingling of abraded materials attributable to the pulverization treatment or the like, non-uniform distribution of the particle size, or bad touch feeling.

In the case of titanium oxide produced by the vapor phase process, the same problems as in the production by the liquid phase process will arise. That is, although ultrafine particulates of titanium oxide may be obtained by the conventional vapor phase process, only particulates of titanium oxide which have underwent grain growth can be obtained, so that for obtaining ultrafine particulates of titanium oxide, the titanium oxide must be strongly cracked or pulverized.

SUMMARY OF THE INVENTION

The present invention has been made to solve these problems and an object of the present invention is to provide particulates, particularly ultrafine particulates of titanium oxide which undergo considerably reduced aggregation and have highly excellent dispersibility.

Another object of the present invention is to provide a production process of producing such particulates of titanium oxide.

As a result of extensive investigations with view to solving the above-described problems, the present inventors have successfully found that in the vapor phase process, preheating each starting material gas can give rise to particulate, particularly ultrafine particulates of titanium having very excellent dispersibility.

More specifically, the process of producing titanium oxide of the present invention is characterized in that in the vapor phase process for producing titanium oxide by oxidizing titanium tetrachloride with an oxidizing gas at a high temperature, a titanium tetrachloride-containing gas and an oxidizing gas are reacted by supplying each gas into a reaction tube after preheating each gas at about 500° C. or more to produce particulates, particularly ultrafine particulates of titanium oxide having a BET specific surface area of from about 3 $m^2/g$ to about 200 $m^2/g$, preferably about 5 $m^2/g$ to about 200 $m^2/g$, and more preferably about 10 $m^2/g$ to about 200 $m^2/g$.

In the process, the preheated titanium tetrachloride-containing gas and the oxidizing gas may be supplied to a reaction tube each at velocity of about 10 m/sec or more.

In the process, the titanium tetrachloride-containing gas and the oxidizing gas may be reacted by supplying these gases into a reaction tube and allowing them to stay there for about 3 seconds or less, preferably 1 second or less, and more preferably 0.5 second or less under a high temperature condition such that the temperature inside the reaction tube exceeds 600° C.

The production process of particulates of titanium oxide of the present invention is characterized in that in the vapor phase process for producing titanium oxide by oxidizing titanium tetrachloride with an oxidizing gas at a high temperature, a titanium tetrachloride-containing gas and an oxidizing gas are each preheated at about 500° C. or more, the preheated titanium tetrachloride-containing gas and the preheated oxidizing gas are supplied to a reaction tube each at a velocity of about 10 m/sec or more, and these gases are reacted by allowing them to stay in the reaction tube at an average velocity of about 5 m/sec or more for about 3 seconds, preferably about 1 second or less, and more preferably 0.5 second or less under a high temperature condition such that the temperature inside the reaction tube exceeds about 600° C.

In this production process, preferably, after each of the titanium tetrachloride-containing gas and the oxidizing gas is preheated at about 500° C. or more, the preheated titanium tetrachloride-containing gas and the preheated oxidizing gas are supplied into the reaction tube to generate turbulence in the reaction tube.

In this process, the titanium tetrachloride-containing gas and the oxidizing gas are supplied into a reaction tube through a coaxial parallel flow nozzle and the inner tube of the coaxial parallel flow nozzle has an inside diameter of 50 mm or less.

In this process, the titanium tetrachloride-containing gas may contain from about 10 to 100% of titanium tetrachloride.

In this process, the titanium tetrachloride-containing gas and the oxidizing gas each may be preheated at a temperature of about 800° C. or more.

The particulates, particularly ultrafine particulates of titanium oxide of the present invention has a BET specific surface area of from about 3 $m^2/g$ to about 200 $m^2/g$, preferably from about 5 $m^2/g$ to about 200 $m^2/g$, and more preferably from about 10 $m^2/g$ to about 200 $m^2/g$, and a diameter corresponding to 90% of the particle size cumulative distribution on a weight basis as D90 diameter, of about 2.2 μm or less.

The particulates, particularly ultrafine particulates of titanium oxide of the present invention has a BET specific surface area of from about from about 3 $m^2/g$ to about 200 $m^2/g$, preferably from about 5 $m^2/g$ to about 200 $m^2/g$, and more preferably from about 10 $m^2/g$ to about 200 $m^2/g$, and a distribution constant n according to the following Rosin-Rammler formula of about 1.7 or more:

$$R=100\ \exp(-bD^n)$$

wherein D is a particle diameter, b is a constant, and n is a distribution constant.

The particulates of titanium oxide of the present invention can be produced by any one of the above-described processes.

The particulates of titanium oxide of the invention may be contained in various compositions.

The above and other objects, effects, features and advantages of the present invention will become more apparent from the following description of preferred embodiments with reference to the attached drawings.

DESCRIPTION OF PREFERRED EMBODIMENTS

Figure 1:
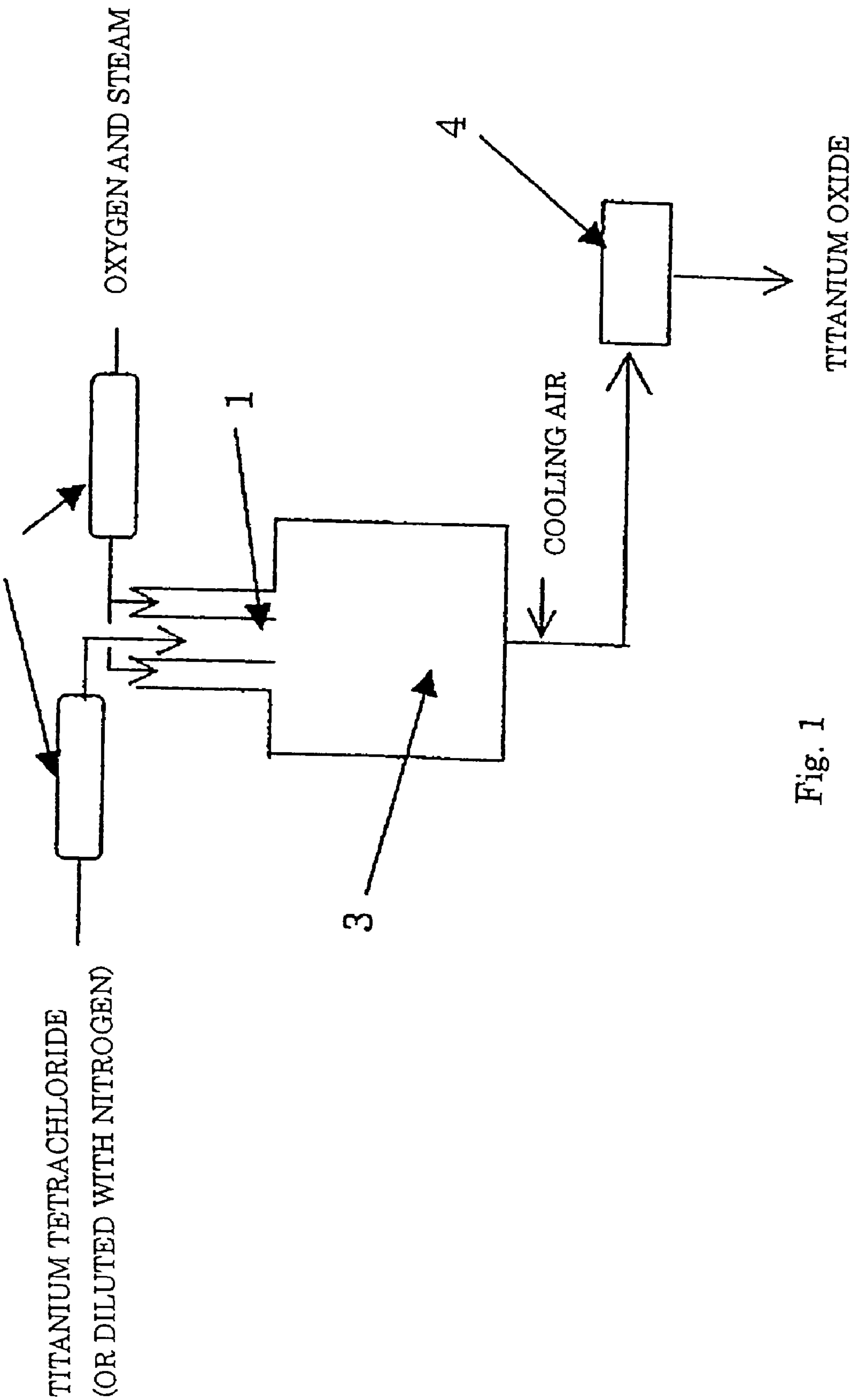
FIG. 1 is a schematic view showing a reaction tube equipped with a coaxial parallel flow nozzle.

The particulates, particularly ultrafine particulates of titanium oxide of the present invention is produced by a vapor phase process starting from a gas containing titanium tetrachloride, where the gas is oxidized using oxygen, steam or a mixed gas thereof (hereinafter referred to as an "oxidizing gas") at a high temperature. Here, the titanium tetrachloride-containing gas and the oxidizing gas each must be preheated at about 500° C. or more.

In the present invention, the titanium tetrachloride-containing gas and the oxidizing gas are preferably introduced into a reaction tube at respective flow rates of about 10 m/sec or more, preferably about 30 m/sec or more. Furthermore, these gases are preferably reacted by allowing these gases to stay in the reaction tube under a high temperature condition and react for a time of 1 second or less (hereinafter, the time being referred to as "high temperature residence time"). The ultrafine titanium oxide particulate produced in such a way has very excellent dispersibility and a BET specific surface area of from about 3 to about 200 $m^2/g$, preferably from about 5 to about 200 $m^2/g$, and more preferably from about 10 to about 200 $m^2/g$. Titanium oxide particles heretofore produced by the vapor phase processes had BET specific surface areas of less than 10 $m^2/g$, respectively.

In the present invention, a particle size distribution measured by a laser diffraction-type particle size measuring process is used as an index of dispersibility. The procedure in the measurement of particle size distribution is described below.

A slurry obtained by adding 50 ml of pure water and 100 μl of a 10% aqueous sodium hexametaphosphate solution to 0.05 g of titanium oxide is irradiated with an ultrasonic wave (46 KHz, 65 W) for 3 minutes. Then, this slurry is measured of particle size by a laser diffraction-type particle size analyzer (SALD-2000J, manufactured by Shimadzu Corporation). It can be said that when the thus-measured D90 diameter (i.e., a diameter corresponding to 90% of the particle size cumulative distribution on a weight basis) is small, good dispersibility in a hydrophilic solvent is attained.

The particulates, particularly ultrafine particulates of titanium oxide of the present invention have excellent uniformity in grain size. In the present invention, the uniformity in grain size is specified by a distribution constant (n) obtained using the Rosin-Rammler formula. The Rosin-Rammler formula is briefly described below. Details thereof are described in *Ceramic Kogaku Handbook* (*Ceramic Engineering Handbook*), compiled by Nippon Ceramics Kyokai, 1st ed., pages 596 to 598.

The Rosin-Rammler formula is represented by the following formula (1):

$$R=100\ \exp(-bD^n) \tag{1}$$

wherein D is a particle diameter, b is a constant, R is a percentage of the number of particles larger than D (particle diameter) to the total number of particles, and n is a distribution constant.

Assuming that $b=1/De^n$, the formula (1) is rewritten as follows:

$$R=100\ \exp\{-(D/De)^n\} \tag{2}$$

wherein De is an absolute size constant and n is a distribution constant. In formula (1) above, the constant b is a constant derived from an absolute size constant, De, i.e., the particle diameter corresponding to an ober particle diameter of 36.8% (R=1/e=0.368), and a distribution constant, n, according to the formula: $b=1/De^n$.

From formula (1) or (2), the following formula (3) is obtained:

$$\log\{\log(100/R)\}=n \log D+C \quad (3)$$

wherein C is a constant. From formula (3), the relationship between logD and log{log(100/R)} is plotted on the Rosin-Rammler (RR) chart where logD is graduated on the x axis and log{log(100/R)} on the y axis. Then, a nearly straight line is obtained. The gradient (n) of this straight line indicates the degree of uniformity of the grain size. It can be said that when the numerical value of n becomes larger, the uniformity of grain size becomes higher.

The particulates, particularly ultrafine particulates of titanium oxide of the present invention preferably have a diameter corresponding to 90% of the particle size cumulative distribution on a weight basis as termed D90 diameter, of about 2.2 μm or less and a distribution constant n by the Rosin-Rammler formula of about 1.7 or more.

The particulates, particularly ultrafine particulates of titanium oxide of the present invention may be contained as a pigment or a particle component using the photocatalytic effect in various compositions. More specifically, the particulates, particularly ultrafine particulates of titanium oxide of the present invention may be used as an additive in various products such as cosmetics, clothes, ultraviolet ray-shielding materials and silicone rubber.

The process of producing titanium oxide is described below.

A general production process of titanium oxide by a vapor phase process is known, where titanium tetrachloride is oxidized using an oxidizing gas such as oxygen or steam under the reaction condition of about 1,000° C. and thereby particulates of titanium oxide are obtained.

The growing mechanism of particulate in the vapor phase process is roughly classified into two types. One is CVD (chemical vapor deposition) and another is the growth by collision (coalescence) and sintering of particles. In either case, the growth time must be short so as to obtain particulates, particularly ultrafine particulates of titanium oxide, which is an object of the present invention. More specifically, in the former growth, the growth may be prevented by elevating the preheating temperature to thereby increase the chemical reactivity (reaction rate). In the latter growth, cooling, dilution or the like is swiftly applied to the particulates after the completion of CVD to thereby reduce the high-temperature residence time as much as possible, so that the growth by sintering and the like can be prevented.

According to the present invention, it has been found that in the vapor phase process where titanium oxide is produced by oxidizing a titanium tetrachloride-containing gas with an oxidizing gas at a high temperature, preheating the titanium tetrachloride-containing gas and the oxidizing gas each at about 500° C. or more can prevent CVD growth so that particulates, particularly ultrafine particulates of titanium oxide having a BET specific surface area of from about 3 to about 200 $m^2/g$, preferably from about 5 to about 200 $m^2/g$, and more preferably from about 10 to about 200 $m^2/g$ can be obtained.

The particulates of titanium oxide particulate of the present invention comprises indefinite-shaped or aspheric particles and differs from the spherical particulate disclosed in JP-A-1-145307 referred to in the item "Background Art" (see the photograph by a transmission electron microscope of titanium oxide particulate obtained in Example 2).

The starting material gas containing titanium tetrachloride preferably has a titanium tetrachloride gas concentration of from about 10 to 100%, more preferably from about 20 to 100%. By using a gas having a titanium tetrachloride concentration of about 10% or more, a large number of uniform nuclei are generated and also the reactivity increases, so that formation of particles under the control of CVD growth can hardly occur and a particulate having a narrow particle size distribution can be obtained.

The gas for diluting the titanium tetrachloride in the titanium tetrachloride-containing gas must be selected from those non-reactive with titanium tetrachloride and also incapable of being oxidized. Specific examples of the preferred diluting gas include nitrogen and argon.

The temperatures at which the preheating of titanium tetrachloride-containing gas and that of oxidizing gas are performed may be the same or different but each must be about 500° C. or more, preferably about 800° C. or more. However, a preheating temperature difference for each gas may be selected freely in the range of about 300° C. or less depending on particle size to be obtained although lower preheating temperature differences are preferred. If the preheating temperature is less than about 500° C., the generation of uniform nuclei is reduced and the reactivity is low, so that the resulting particulate will have a broad particle size distribution. On the other hand, it is sufficient for the preheating temperature to be the same as or lower than the reaction temperature described hereinbelow.

The titanium tetrachloride-containing gas and the oxidizing gas are introduced into a reaction tube at respective velocities of preferably about 10 m/sec or more. By increasing the velocities, mixing of two gases is accelerated. When the temperature at the introduction of gases into a reaction tube is about 500° C. or more, the reaction is completed at the same time with the mixing, so that the generation of uniform nuclei can be increased and the zone where the formation of particles under the control of CVD growth occurs can be shortened.

In the present invention, it is preferred that the starting material gas be introduced into a reaction tube so as to attain thorough mixing of the gases introduced into the reaction tube. As long as the gases are thoroughly mixed, the fluid state of gas within the reaction tube is not particularly limited. For example, a fluid state causing turbulence is preferred. Also, a spiral vortex may be present therein. The presence of the above-described preheating temperature difference is convenient since under such a condition, turbulence or spiral vortex can occur in the gas introduced into the reaction tube.

The inlet nozzle for introducing the starting material gas into the reaction tube may be a nozzle of giving a coaxial parallel flow, an oblique flow or a cross flow. However, the present invention is by no means limited thereto. A coaxial parallel flow nozzle is generally preferred in view of the design because the structure is simple, though it is inferior to some extent in the mixing degree to the nozzles capable of giving an oblique flow or a cross flow.

For example, in the case of a coaxial parallel flow nozzle, the titanium tetrachloride-containing gas is introduced through the inner tube. In this case, the inner tube preferably has a diameter of about 50 mm or less from the standpoint of mixing the gases.

In the present invention, the gases introduced into the reaction tube flow preferably at a high velocity within the reaction tube so as to attain complete mixing. The velocity is preferably about 5 m/sec or more in terms of the average velocity. When the gas velocity within the reaction tube is about 5 m/sec or more, thorough mixing can be attained in the reaction tube. Moreover, the generation of particles under the control of CVD growth is reduced and the particulate produced is prevented from having a broad particle size distribution.

The reaction within the reaction tube is an exothermic reaction and the reaction temperature is higher than the sintering temperature of particulates, particularly ultrafine particulates of titanium oxide produced. Therefore, although the heat is released from the reactor, sintering of the produced particulates, particularly ultrafine particulates of titanium oxide proceeds and grown particulates results unless the particulates are rapidly cooled after the reaction. In the present invention, it is preferred to set the high-temperature residence time within the reaction tube in excess of about 600° C. to about 3 seconds or less, preferably 1 second or less, more preferably 0.5 second or less and to rapidly cool the particulate after the reaction.

For rapidly cooling the particulates after the reaction, a large amount of cooling air or a gas such as nitrogen may be introduced into the reaction mixture or water may be sprayed thereon.

FIG. 1 shows a schematic view of a reaction tube equipped with a coaxial parallel flow nozzle for use in the production of titanium oxide according to the present invention. The titanium tetrachloride-containing gas is preheated to a predetermined temperature by a preheating unit 2 and then introduced into a reaction tube 3 through an inner tube of the coaxial parallel flow nozzle part 1. The oxidizing gas is preheated to a predetermined temperature by the preheating unit 2 and introduced into the reaction tube 3 through an outer tube of the coaxial parallel flow nozzle part 1. In the present invention, the temperatures of the preheating units 2 may be the same or different. The gases introduced into the reaction tube are mixed and reacted, thereafter rapidly cooled by a cooling gas and then sent to a bag filter 4 where the ultrafine titanium oxide particulate is collected.

EXAMPLES

The present invention is described in greater detail by referring to the Examples, however, the present invention should not be construed as being limited thereto.

Example 1

A gas containing 11.8 $Nm^3$/hr (N means normal temperature and pressure, i.e., 0° C., 760 mmHg, hereinafter the same) of gaseous titanium tetrachloride in a concentration of 100% and a mixed gas containing 8 $Nm^3$/hr of oxygen and 20 $Nm^3$/hr of steam were preheated each to 1,000° C. and then introduced into a reaction tube through a coaxial parallel flow nozzle at velocities of 49 m/sec and 60 m/sec, respectively. Here, the reaction was performed in a reaction tube as shown in FIG. 1, the coaxial parallel flow nozzle had an inner tube diameter of 20 mm, and the titanium tetrachloride-containing gas was introduced through the inner tube.

The reaction tube had an inside diameter of 100 mm and the velocity within the reaction tube at a reaction temperature of 1,320° C. was 10 m/sec as a calculated value. After the reaction, a cooling air was introduced into the reaction tube so that the high-temperature residence time in the reaction tube could be 0.3 second or less. Thereafter, the particulates of powder produced were collected using a Teflon-made bag filter.

The particulates of titanium oxide obtained had a BET specific surface area of 14 $m^2$/g. Furthermore, measurement of the particulates of titanium oxide obtained on the particle size distribution by a laser diffraction-type particle size distribution measuring method indicated that the diameter corresponding to 90% of the particle size cumulative distribution on a weight basis as termed D90 diameter was 0.8 μm. The n value according to the Rosin-Rammler formula was 2.8. The n value was obtained by plotting three-point data D10, D50 and D90 obtained in the laser diffraction on the RR chart as R=90%, 50% and 10%, respectively, and determined from an approximate straight line drawn on these 3 points.

Example 2

A titanium tetrachloride-containing gas obtained by mixing 8.3 $Nm^3$/hr of gaseous titanium tetrachloride and 6 $Nm^3$/hr of nitrogen and an oxidizing gas obtained by mixing 4 $Nm^3$/hr of oxygen and 15 $Nm^3$/hr of steam were preheated to 800° C. and 900° C., respectively, and introduced into a reaction tube through a coaxial parallel flow nozzle at velocities of 50 m/sec and 38 m/sec, respectively. Here, the coaxial parallel flow nozzle had an inner tube diameter of 20 mm and the titanium tetrachloride-containing gas was introduced through the inner tube.

The reaction tube had an inside diameter of 100 mm and the velocities within the reaction tube at a reaction temperature of 1,200° C. was 8 m/sec as a calculated value. After the reaction, a cooling air was introduced into the reaction tube so that the high-temperature residence time in the reaction tube could be 0.2 second or less. Thereafter, the particulate powder produced was collected using a Teflon-made bag filter.

The particulates of titanium oxide obtained had a BET specific surface area of 78 $m^2$/g. Furthermore, measurement of the particulates of titanium oxide obtained on the particle size distribution by a laser diffraction-type particle size distribution measuring method indicated that the diameter corresponding to 90% of the particle size cumulative distribution on a weight basis as termed D90 diameter was 1.4 μm. The n value according to the Rosin-Rammler formula was 2.1.

Figure 2:
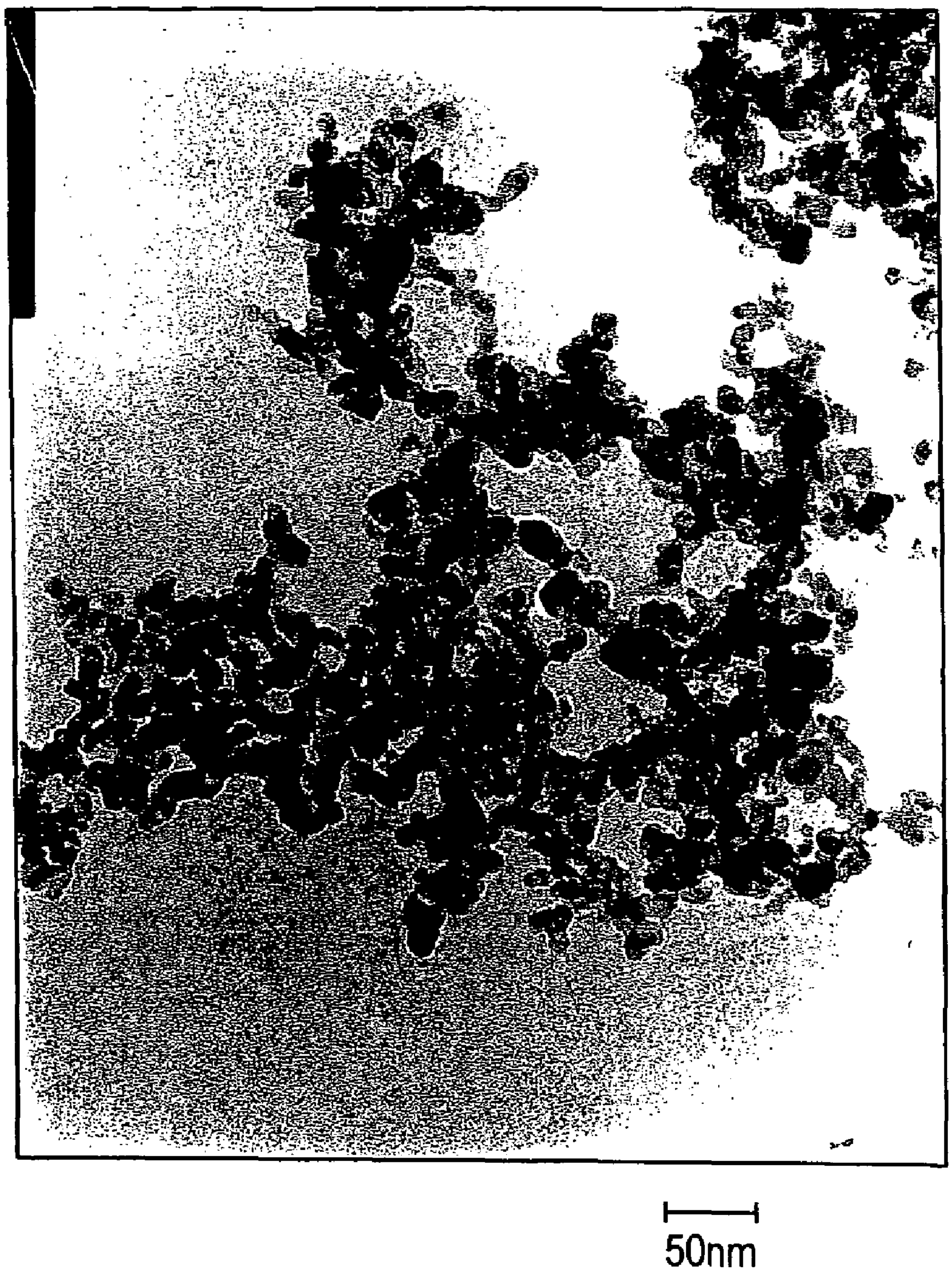
FIG. 2 is a TEM photograph of titanium oxide obtained in Example 2.

Also, the particulates of titanium oxide obtained were examined through a transmission electron microscope (TEM) and as a result, particles having an aspheric or indefinite shape were observed as shown in the TEM photograph of FIG. 2.

Example 3

A titanium tetrachloride-containing gas obtained by mixing 4.7 $Nm^3$/hr of gaseous titanium tetrachloride and 16 $Nm^3$/hr of nitrogen and an oxidizing gas obtained by mixing 20 $Nm^3$/hr of air and 25 $Nm^3$/hr of steam were each preheated to 1,100° C. and 1,000° C., respectively, and then introduced into a reaction rough a coaxial parallel flow nozzle at velocites of 92 m/sec and 97 m/sec, respectively. Here, the coaxial parallel flow nozzle had an inner tube diameter of 20 mm and the titanium tetrachloride-containing gas was introduced through the inner tube.

The reaction tube had an inside diameter of 100 mm and the velocity within the reaction tube at a reaction temperature of 1,250° C. was 13 m/sec as a calculated value. After the reaction, a cooling air was introduced into the reaction tube so that the high-temperature residence time in the reaction tube could be 0.2 second or less. Thereafter, the particulate powder produced was collected using a Teflon-made bag filter.

The particulates of titanium oxide obtained had a BET specific surface area of 115 $m^2/g$. Furthermore, measurement of the particulates of titanium oxide obtained on the particle size distribution by a laser diffraction-type particle size distribution measuring method indicated that the diameter corresponding to 90% of the particle size cumulative distribution on a weight basis as termed D90 diameter was 2.1 μm. The n value according to the Rosin-Rammler formula was 1.8.

Comparative Example 1

11.8 $Nm^3$/hr of gaseous titanium tetrachloride in a concentration of 100% and an oxidizing gas obtained by mixing 8 $Nm^3$/hr of oxygen and 20 $Nm^3$/hr of steam were preheated to 400° C. and 850° C., respectively, and introduced into a reaction tube through a coaxial parallel flow nozzle at velocities of 26 m/sec and 40 m/sec, respectively. Here, the coaxial parallel flow nozzle had an inner tube diameter of 20 mm and the titanium tetrachloride-containing gas was introduced through the inner tube.

The reaction tube had an inside diameter of 100 mm and the velocity within the reaction tube at a reaction temperature of 680° C. was 5.6 m/sec as a calculated value. After the reaction, a cooling air was introduced into the reaction tube so that the high-temperature residence time in the reaction tube could be 0.3 second or less. Thereafter, the powder produced was collected using a Teflon-made bag filter.

The particles of titanium oxide obtained had a BET specific surface area of 8 $m^2/g$. Furthermore, measurement of the particles of titanium oxide obtained on the particle size distribution by a laser diffraction-type particle size distribution measuring method indicated that the diameter corresponding to 90% of the particle size cumulative distribution on a weight basis as termed D90 diameter was 11/μm. The n value according to the Rosin-Rammler formula obtained in the same manner as in Example 1 was 1.1.

In comparison with Example 1, both the primary particle size and the secondary particle size were large and the particle size distribution was broad.

Comparative Example 2

11.8 $Nm^3$/hr of gaseous titanium tetrachloride in a concentration of 100% and an oxidizing gas obtained by mixing 8 $Nm^3$/hr of oxygen and 20 $Nm^3$/hr of steam were preheated each to 1,000° C. and then introduced into a reaction tube through a coaxial parallel flow nozzle at velocities of 5.4 m/sec and 23 m/sec, respectively. Here, the coaxial parallel flow nozzle having an inner tube diameter of 60 mm and the titanium tetrachloride-containing gas was introduced through the inner tube.

The reaction tube had an inside diameter of 100 mm and the velocity within the reaction tube at a reaction temperature of 1,320° C. was 10 m/sec as a calculated value. After the reaction, a cooling air was introduced into the reaction tube so that the high-temperature residence time in the reaction tube could be 0.3 second or less. Thereafter, the powder produced was collected using a Teflon-made bag filter.

The particles of titanium oxide obtained had a BET specific surface area of 8 $m^2/g$. Furthermore, measurement of the particles of titanium oxide obtained on the particle size distribution by a laser diffraction-type particle size distribution measuring method indicated that the diameter corresponding to 90% of the particle size cumulative distribution on a weight basis as termed D90 diameter was 2.3 μm. The n value according to the Rosin-Rammler formula obtained in the same manner as in Example 1 was 1.6.

In comparison with Example 1, both the primary particle size and the secondary particle size were large and the particle size distribution was broad.

Comparative Example 3

11.8 $Nm^3$/hr of gaseous titanium tetrachloride in a concentration of 100% and an oxidizing gas obtained by mixing 8 $Nm^3$/hr of oxygen and 20 $Nm^3$/hr of steam were preheated each to 1,000° C. and then introduced into a reaction tube through a coaxial parallel flow nozzle at velocities of 49 m/sec and 32 m/sec, respectively. Here, the coaxial parallel flow nozzle had an inner tube diameter of 20 mm and the titanium tetrachloride-containing gas was introduced through the inner tube.

The reaction tube had an inside diameter of 100 mm and the velocity within the reaction tube at a reaction temperature of 1,320° C. was 14 m/sec as a calculated value. After the reaction, a cooling air was introduced into the reaction tube so that the high-temperature residence time in the reaction tube could be 2 seconds. Thereafter, the fine particulate powder produced was collected using a Teflon-made bag filter.

The particles of titanium oxide obtained had a BET specific surface area of 8 $m^2/g$. Furthermore, measurement of the particles of titanium oxide obtained on the particle size distribution by a laser diffraction-type particle size distribution measuring method indicated that the diameter corresponding to 90% of the particle size cumulative distribution on a weight basis as termed D90 diameter was 1.8 μm. The n value according to the Rosin-Rammler formula obtained in the same manner as in Example 1 was 2.0.

In comparison with Example 1, both the primary particle size and the secondary particle size were large and the particle size distribution was broad.

Comparative Example 4

11.8 $Nm^3$/hr of gaseous titanium tetrachloride in a concentration of 100% and an oxidizing gas obtained by mixing 8 $Nm^3$/hr of oxygen and 20 $Nm^3$/hr of steam were preheated each to 1,000° C. and then introduced into a reaction tube through a coaxial parallel flow nozzle at velocities of 49 m/sec and 60 m/sec, respectively. Here, the coaxial parallel flow nozzle had an inner tube diameter of 20 mm and the titanium tetrachloride-containing gas was introduced through the inner tube.

The reaction tube had an inside diameter of 250 mm and the velocity within the reaction tube at a reaction temperature of 1,320° C. was 1.6 m/sec as a calculated value. After the reaction, a cooling air was introduced into the reaction tube so that the high-temperature residence time in the reaction tube could be 0.3 second or less. Thereafter, the fine particulate powder produced was collected using a Teflon-made bag filter.

The particles of titanium oxide obtained had a BET specific surface area of 9 $m^2/g$. Furthermore, measurement of the particles of titanium oxide obtained on the particle size distribution by a laser diffraction-type particle size distribution measuring method indicated that the diameter corresponding to 90% of the particle size cumulative distribution on a weight basis D90 diameter was 4.2 μm. The n value according to the Rosin-Rammler formula obtained in the same manner as in Example 1 was 1.4.

In comparison with Example 1, both the primary particle size and the secondary particle size were large and the particle size distribution was broad.

Comparative Example 5

11.8 $Nm^3$/hr of gaseous titanium tetrachloride in a concentration of 100% and an oxidizing gas obtained by mixing 8 $Nm^3$/hr of oxygen and 20 $Nm^3$/hr of steam were preheated to 400° C. and 500° C., respectively, and then introduced into a reaction tube through a coaxial parallel flow nozzle at velocities of 46 m/sec and 40 m/sec, respectively. Here, the coaxial parallel flow nozzle had an inner tube diameter of 15 mm and the titanium tetrachloride-containing gas was introduced through the inner tube.

The reaction tube had an inside diameter of 100 mm and the velocity within the reaction tube at a reaction temperature of 550° C. was 5.3 m/sec as a calculated value. After the reaction, a cooling air was introduced into the reaction tube so that the high-temperature residence time in the reaction tube could be 0.3 second or less. Thereafter, the fine particulate powder produced was collected using a Teflon-made bag filter.

The particles of titanium oxide obtained had a BET specific surface area of 7 $m^2/g$. Furthermore, measurement of the particles of titanium oxide obtained on the particle size distribution by a laser diffraction-type particle size distribution measuring method indicated that the diameter corresponding to 90% of the particle size cumulative distribution on a weight basis as D90 diameter was 15 μm. The n value according to the Rosin-Rammler formula obtained in the same manner as in Example 1 was 0.9.

In comparison with Example 1, both the primary particle size and the secondary particle size were large and the particle size distribution was broad.

As described in detail in the foregoing, according to the present invention, in the vapor phase process for producing titanium oxide by oxidizing titanium tetrachloride with an oxidizing gas at a high temperature, the titanium tetrachloride-containing gas and the oxidizing gas are reacted after preheating each gas at about 500° C. or more, whereby particulates, particularly ultrafine particulates of titanium oxide having excellent dispersibility and having a BET specific surface area of from about 3 $m^2/g$ to about 200 $m^2/g$, preferably from about 5 $m^2/g$ to about 200 $m^2/g$, and more preferably from about 10 to about 200 $m^2/g$ can be obtained.

Furthermore, the particulates, particularly ultrafine particulates of titanium oxide of the present invention has a sharp particle size distribution and excellent dispersibility in a hydrophilic solvent and therefore, the step of cracking titanium oxide or the like means can be dispensed with or an extremely light facility may suffice to this purpose. Thus, the present invention has a very great value in the industrial practice.

The invention may be embodied in other specific forms without departing from the spirit or essential characteristics thereof. Therefore, the present embodiment is to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pigment comprising a titanium oxide having a BET specific surface area of from about 3 $m^2/g$ to about 200 $m^2/g$ and a D90 diameter corresponding to 90% of a particle size cumulative distribution on a weight basis of about 2.2 μm or less.

2. A photocatalyst composition comprising a titanium oxide having a BET specific surface area of from about 3 $m^2/g$ to about 200 $m^2/g$ and a D90 diameter corresponding to 90% of a particle size cumulative distribution on a weight basis of about 2.2 μm or less.

3. A cosmetic comprising a titanium oxide having a BET specific surface area of from about 3 $m^2/g$ to about 200 $m^2/g$ and a D90 diameter corresponding to 90% of a particle size cumulative distribution on a weight basis of about 2.2 μm or less.

4. A cloth comprising a titanium oxide having a BET specific surface area of from about 3 $m^2/g$ to about 200 $m^2/g$ and a D90 diameter corresponding to 90% of a particle size cumulative distribution on a weight basis of about 2.2 μm or less.

5. An ultraviolet ray-shielding material comprising a titanium oxide having a BET specific surface area of from about 3 $m^2/g$ to about 200 $m^2/g$ and a D90 diameter corresponding to 90% of a particle size cumulative distribution on a weight basis of about 2.2 μm or less.

6. A silicone rubber comprising a titanium oxide having a BET specific surface area of from about 3 $m^2/g$ to about 200 $m^2/g$ and a D90 diameter corresponding to 90% of a particle size cumulative distribution on a weight basis of about 2.2 μm or less.

* * * * *